(12) United States Patent
Brück et al.

(10) Patent No.: US 11,731,356 B2
(45) Date of Patent: Aug. 22, 2023

(54) ADDITIVE MANUFACTURING APPARATUS AND METHOD FOR OPERATING THE APPARATUS

(71) Applicant: SLM Solutions Group AG, Lübeck (DE)

(72) Inventors: Daniel Brück, Lübeck (DE); Zhuo Peng, Lübeck (DE); Naveed Iqbal, Lübeck (DE); Torsten Kuntoff, Lübeck (DE); Hendrik Jargstorf, Lübeck (DE)

(73) Assignee: SLM SOLUTIONS GROUP AG, Lübeck (DE)

( * ) Notice: Subject to any disclaimer, the term of this patent is extended or adjusted under 35 U.S.C. 154(b) by 157 days.

(21) Appl. No.: 17/354,943

(22) Filed: Jun. 22, 2021

(65) Prior Publication Data
US 2021/0402691 A1    Dec. 30, 2021

(30) Foreign Application Priority Data

Jun. 25, 2020  (EP) ..................................... 20182341
Nov. 9, 2020   (EP) ..................................... 20206428

(51) Int. Cl.
*B29C 64/25*     (2017.01)
*B29C 64/153*    (2017.01)
(Continued)

(52) U.S. Cl.
CPC ............ *B29C 64/25* (2017.08); *B29C 64/153* (2017.08); *B29C 64/245* (2017.08);
(Continued)

(58) Field of Classification Search
CPC .................................................. B29C 64/153
See application file for complete search history.

(56) References Cited

U.S. PATENT DOCUMENTS 9,061,465 B2    6/2015  Hagiwara
2017/0001243 A1 1/2017  Hayano
                (Continued)

FOREIGN PATENT DOCUMENTS

DE  102006056422 B3  4/2008
DE  102010052206 A1  5/2012
        (Continued)

OTHER PUBLICATIONS

Extended European Search Report issued in Application EP 21181342.3 and dated Sep. 29, 2021; 9 pages.

*Primary Examiner* — Joseph S Del Sole
*Assistant Examiner* — Ariella Machness
(74) *Attorney, Agent, or Firm* — Quarles & Brady LLP; Yakov S. Sidorin

(57) ABSTRACT

A process chamber housing for an additive manufacturing apparatus comprising a process chamber with a bottom, a ceiling, and sidewalls jointly enclosing a volume of the process chamber, with a gas inlet in a front wall and a gas outlet in a rear wall of the sidewalls. The gas inlet and outlet are positioned at opposite sides of an opening in the bottom and face each other, which allows for an improved removal of smoke out of the process chamber if the gas inlet has a width $w_i$, the opening has a width $w_s$, and the gas outlet has a width $w_o$, such that at least one of the relations (i) $w_i \geq w_s \pm 4$ cm and $w_o \geq w_s \pm 4$ cm; (ii) $w_i \geq w_s$ and/or $w_o \geq w_s$; and (iii) $w_i \geq w_s + 1$ cm and/or $w_o \geq w_s + 1$ cm is satisfied.

28 Claims, 6 Drawing Sheets

(51) Int. Cl.
  *B33Y 30/00*     (2015.01)
  *B29C 64/264*    (2017.01)
  *B29C 64/364*    (2017.01)
  *B29C 64/245*    (2017.01)
  *B33Y 40/20*     (2020.01)

(52) U.S. Cl.
  CPC .......... *B29C 64/264* (2017.08); *B29C 64/364* (2017.08); *B33Y 30/00* (2014.12); *B33Y 40/20* (2020.01)

(56) References Cited

U.S. PATENT DOCUMENTS

| | | |
|---|---|---|
| 2018/0111198 A1 | 4/2018 | Vitanov |
| 2018/0111319 A1* | 4/2018 | Brezoczky ............ B29C 64/255 |
| 2018/0281237 A1 | 10/2018 | Frechman |
| 2019/0030815 A1* | 1/2019 | Büchner ............... B29C 64/153 |
| 2020/0061653 A1* | 2/2020 | Wakelam ............. B05B 12/087 |

FOREIGN PATENT DOCUMENTS

| | | | | |
|---|---|---|---|---|
| DE | 102018210260 A1 * | 12/2019 | ............. | B22F 10/20 |
| DE | 102018210260 A1 | 12/2019 | | |
| EP | 1234625 A1 | 8/2002 | | |
| EP | 3321003 A1 | 5/2018 | | |
| EP | 3620245 A1 * | 3/2020 | ............. | B22F 10/20 |
| EP | 3620245 A1 | 3/2020 | | |
| EP | 3640011 A1 * | 4/2020 | ............. | B22F 10/20 |
| WO | 2017143145 A1 | 8/2017 | | |
| WO | 2018156264 A1 | 8/2018 | | |
| WO | WO-2019110029 A1 * | 6/2019 | ............. | B22F 10/20 |

* cited by examiner

ADDITIVE MANUFACTURING APPARATUS AND METHOD FOR OPERATING THE APPARATUS

CROSS-REFERENCE TO RELATED APPLICATIONS

This application claims priority to pending European Application No. 20182341.6 filed on 25 Jun. 2020 and pending European Application No. 20206428.3 filed on 9 Nov. 2020.

BACKGROUND

1. Field of the Invention

The invention relates to a process chamber housing for an additive manufacturing apparatus. The process chamber housing includes a process chamber. The process chamber is at least defined by a bottom, a ceiling, and side walls, which jointly enclose a volume of the process chamber. A gas inlet into the process chamber enables a gas flow into the process chamber, and a gas outlet enables release of the gas flow out of the process chamber. The bottom has an opening configured to receive a movable support for supporting a three-dimensional (3D) object during the process of additive manufacturing. The gas inlet and the gas outlet are preferably positioned at opposite sides of the opening and both face towards each other, thereby being configured to provide a gas flow in a main flow direction over the opening (i.e. from the gas inlet in a front wall of the side walls to the gas outlet in a rear wall of the side walls). The invention further relates to an additive manufacturing apparatus with the process chamber housing.

2. Description of Related Art

Additive manufacturing is a growingly important and capable method of manufacturing 3D workpieces. There are different variants of additive manufacturing, but this disclosure is focused on methods and apparatus for joining/uniting/combining powder particles by selectively heating the particles, e.g. on or at a top of a bed of powder particles to adhere some of the particles to each other. The powder particles are adhered by sintering, fusing and/or welding the particles to each other. The heat for these processes is typically provided by preferably focused radiation, for example by an electron beam or by a laser beam, selectively heating portions of the top layer of the powder bed, thereby attaching particles of the top layer to particles of a preceding layer. This process is generally referred to as powder bed fusion process or simply powder-fusion process. In this disclosure no particular distinction is made between different types of used radiation, which radiation is referred to simply as "beam" or "beams".

Modern apparatus for powder-bed fusion have a housing with a process chamber. The process chamber has a support opening for accommodating a movably held support unit (or simply support). Initially, a thin layer of powder is applied to the support. This is mostly accomplished by a recoater. The recoater is a vehicle contraption driven forth and back over the opening in the bottom, thereby coating the support with a layer of powder. Recoaters have been described in a number of publications, e.g. in WO 2018/156264 A1, WO 2017/143145A1, EP 1 234 625 A and DE102006056422B3, to name only a few. These recoaters can be classified very roughly in two groups (i) the recoaters that supply powder to the bottom of the process chamber (e.g. by an opening next to the support for the workpiece and subsequently distributed by a distributor; typically a distributor has at least one of a blade, a roller, a lip or a similar means configured for traveling over the support to thereby form a layer of fresh powder over the support) and (ii) the ones in which a powder reservoir is movably supported to travel over the support, thereby applying a layer of fresh powder on the support. Often, the recoaters of the second group as well comprise one or more distributors for planing the powder layer. Once a fresh layer of powder has been applied, a beam is applied to and passed over the coated surface, thereby adhering some powder grains to each other and in some cases to the support as well. The support is subsequently lowered, and the recoater applies the next layer of powder. The next layer is as well subjected to the beam for selectively adhering powder grains to each other and the structure of previously adhered grains. The process of lowering the support, applying a new layer of powder, and laser "writing" is iterated to thereby obtain a 3D object. This process has been described in a number of publications, e.g. in US 2017/0001243 A1, U.S. Pat. No. 9,061,46562, to name only two.

As taught, e.g. by EP 3 321 003, the process chamber is advantageously filled with an inert gas. During the additive manufacturing process, the inert gas flows from a gas inlet over the bottom of the chamber and thus over the top layer of powder on the support to a gas outlet. EP 3 321 003 aims for an essentially laminar flow of inert gas to thereby remove fumes, smoke or other side products of the fusing process. To this end, the inlet opening is made of a porous material to thereby release an essentially homogenous flow of the inert gas through the process chamber.

DE 10 2018 210 260 A1 suggests a process chamber of an additive manufacturing apparatus having a movably support in an opening of the bottom of the process chamber on which portions of a powder bed are sintered to thereby obtain a workpiece. To improve the quality of the workpiece, it is suggested to provide to inert gas streams flowing above the powder bed, namely a lower inert gas stream having a first flow speed and an upper inert gas stream having a second flow speed. The flow speed of the lower inert gas stream is greater than the flow speed of the upper inert gas stream.

EP 3629245A1 suggests, as well, a process chamber of an additive manufacturing apparatus with two inert gas streams. Here, a first main inert gas stream is directed parallel to the process chamber bottom over the powder bed. A second auxiliary inert gas stream is undirected. Guiding means are provided the control the boundary between the two streams.

US 2020/0061653 A suggests to use the Coanda Effect to attach a laminar inert gas stream to the powder bed of an additive manufacturing apparatus, to thereby remove residues smoke and the like from the area above the powder bed when fusing portions of the powder bed.

US 2018/0281237 A1 and US 2018/0111198 A1 each suggest an additive manufacturing apparatus with a process chamber having a recoater garage in a side wall of the process chamber housing. The recoater garage has a garage door which is configured to be closed during the fusing process and which is subsequently opened to enable a recoater to pass over a powder bed for applying a new layer of fusible powder and to be parked after recoating the powder bed in said recoater garage.

SUMMARY

The problem underlying the idea of the invention is to shorten manufacturing times without decreasing the quality of the workpieces.

The implementations of the idea of the invention solve the problem of shortening the additive manufacturing time for a given 3D workpiece, e.g., by reducing fluctuations of the flow velocity of the inert gas flowing from the gas inlet to the gas outlet, at least in the vicinity of the upper layer of the powder bed.

The embodiments of the invention provide a process chamber housing for an additive manufacturing process, in particular for the powder bed fusion process. The implemented process chamber housing provides an improved process chamber configured to increase the inert gas flow rate through the process chamber, without depletion of the powder bed due to local flow rate maxima. The process chamber has a bottom, a ceiling and walls, i.e. a front wall, rear wall and two side walls each connecting the front wall with the rear wall. The walls each connect the bottom and the ceiling). The bottom, the ceiling and the walls jointly enclose a volume of the process chamber and thus define the process chamber.

According to the idea of the invention, at least one of the walls may preferably have at least one housing door or may even be itself a housing door, wherein the housing door has a housing door opening and a housing door panel, the latter being briefly referred to as a door panel. In other words, the at least one optional housing door may have at least one housing door opening enabling access to the interior of the process chamber, e.g. for maintenance of the process chamber (cleaning, repair of movable parts, replacement of worn parts, etc.), if the housing door is open. If the housing door is closed, access to the interior, i.e. to the process chamber, via the housing door opening is blocked by the door panel. In other words, the terminology "a wall having a housing door" is intended to express and defines that at least a part of the respective wall is movably attached to another portion of the process chamber, thereby enabling to reversibly pivot and/or slide the movably attached portion, the so-called door panel, from a closed position and/or orientation to an open position and/or orientation. The movable attachment can be obtained, e.g. by at least one hinge and/or at least one guide rail. In the closed position the housing door panel blocks, i.e. closes the door opening of the process chamber housing. In the open position and/or orientation of the housing door, the opening is released, thus access to the process chamber from outside of the process chamber (and from outside of the garage) via the housing door opening is enabled.

The bottom of the process chamber has a support opening, i.e. at least one support opening, configured to receive a movable support unit, i.e. at least one movable support, for supporting a 3D object during the process of additive manufacturing. The optional support may be movably held or kept, e.g., configured for being retracted downwards below the surface of the bottom, i.e. into the support opening. After each retraction, an optional recoater may apply a new layer of the powder, which is subsequently selectively fused by an energy source, like e.g. a laser.

The process chamber has a gas inlet for providing a gas flow into the process chamber and a gas outlet for releasing the gas flow out of the process chamber. The gas inlet and the gas outlet are preferably at opposite sides of the process chamber. For example, the gas inlet and the gas outlet may be positioned at opposite sides of the support opening and may both face towards the respective other. They may thus be configured to provide a gas flow in a main flow direction through the process chamber over the support opening, from the gas inlet to the gas outlet. Smoke produced during the fusion process is thus transported by the inert-gas flow to the gas outlet and thereby removed from the process chamber.

In a preferred example, the gas inlet has a width $w_i$, the support opening has a width $w_s$ and the gas outlet has a width $w_o$, the widths $w_i$, $w_o$, and $w_s$ being measured perpendicularly to the main flow direction. Particularly preferred is a configuration providing for $w_i \geq w_s \pm 4$ cm and/or $w_o \geq w_s \pm 4$ cm (the indicated error margin is preferably smaller, depending on the specific implementation, e.g. 2 cm, 1 cm, 0.5 cm or less, particularly preferred is a no-margin case of 0 cm), thus the widths of the inlet and or outlet openings are preferably at least essentially (as expressed by the error margins ±4 cm) greater or equal to the width of the support. In operation, this measure provides for a homogenous gas flow over the entire width of the support opening, and thus over the entire width of the powder bed. Additionally or alternatively, a configuration obeying the relation $w_i \pm 15\%$ and/or $w_o \geq w_s \pm 15\%$ of $w_s$ can be applied. Preferably, $w_i$, $w_o$ and $w_s$ obey the relation $w_i \geq w_s$ and/or $w_o \geq w_s$, even more preferred $w_i \geq w_s + d_w$ and/or $w_o \geq w_s + d_d$, wherein $d_w \leq 5$ cm, e.g. $d_d \in \{5$ cm, $4$ cm, $3$ cm, $2$ cm, $1$ cm, $0.5$ cm$\}$. Particularly preferred is the case when the width of the gas inlet $w_i$ is at least essentially identical to the distance $d_{12}$ between the first and the second sidewalls, wherein at least essentially identical implies that $w_i = d_{12}$ is preferred, however a slightly smaller value $w_i$ can be accepted, e.g. $w_i \geq d_{12} - 1$ cm, $w_i \geq d_{12} - 0.5$ cm and/or $w_i \geq d_{12} - 0.25$ cm.

The above (and below) dimensional relations are based on the assumption that in a preferred example the support opening defines the usable width of powder bed $w_{upb}$, i.e. $w_{upb} = w_s$. In the case when the usable width $w_{upb}$ is defined elsewise, the corresponding dimension may take the position of $w_s$ in the above relations. In other words, in the above relations $w_s$ may be replaced by $w_{upb}$. The usable width $w_{upb}$ is may be defined by the minimum of the widths of the powder bed $w_b$ and the width the beam can span (being symbolized by $w_r$) perpendicular to the flow direction at the height of the top of the powder bed, 'beam span $w_r$' for short.

In practice the beam span $w_r$ is preferably limited by the firmware controlling the deflection of the beam at least essentially to the width of the support opening to thereby enhance safety and the maximum dimension of the workpieces that can be manufactured. Hence, one could artificially reduce the width of the usable powder bed $w_{upb}$ by adjustments to or by the firmware to thereby increase the quality of the manufactured workpiece when sacrificing the maximum dimension of the workpieces. For example, the firmware may provide for different structural modes or configurations associated to different product quality levels. For example, the firmware may have a first mode or configuration, in which the beam span $w_r$ is limited to the width of the support opening $w_s$ and a second mode in which the beam span $w_r$ is reduced to thereby artificially reduce the width of the usable powder bed $w_{upb}$ to thereby obtain artificially a smaller $w_{upb}$. This artificial constraint by the firmware may not be misunderstood to be realized by producing only a single small workpiece on a large powder bed, although the firmware would allow a beam deflection covering the entire width of the powder bed. The term "firmware" is defined to cover and include any software that is not changed by a user when adapting an additive manufacturing apparatus to manufacture a particular workpiece. The firmware so-to-speak is configured to operate the manufacturing apparatus and provide a user interface devised for providing the information about the workpiece to be manufactured to the additive manufacturing apparatus. In other examples, the beam span $w_r$ may be limited mechanically or optically.

The width of the usable powder bed hence defines the maximum width of the built area. In this sense, one may define $w_s$ as $w_s = \text{Min}(w_b, w_r)$. In practice, the beam can usually span (at least) the entire powder bed, i.e. it can be pivoted from one end to the opposed end of the powder bed, to thereby maximize the maximum dimension of the 3D-piece that can be produced with a given apparatus. Similarly, in practice the width of the support opening $w_s$ is chosen to limit the width of the powder bed. Hence, in practical applications a preferred design goal is to have $w_b = w_s$ and/or $w_r \geq \text{Max}(w_b, w_s)$. Only for simplicity, the width of the support opening $w_s$ was used above instead of the usable width of the powder bed, as the width of the support opening provides a vivid reference, because the support opening is visible even if the apparatus including the housing is not in operation.

In a preferred example, the widths of the gas inlet and of the gas outlet are at least essentially equal to one another, e.g. $w_i = w_o \pm d_1$, wherein $d_1 \leq 5$ cm, e.g. $d_1 \in \{5 \text{ cm}, 4 \text{ cm}, 3 \text{ cm}, 2 \text{ cm}, 1 \text{ cm}, 0.5 \text{ cm}, 0.25 \text{ cm}, 0 \text{ cm}\}$, smaller values of $d_1$ are preferred.

Particularly preferred is the configuration in which the process chamber has a free width $w_c(l, h)$. The free width $w_c(l, h)$ is measured perpendicularly to the main flow direction over the support opening and may be a function of a distance $l$ from a vertical plane being defined by the gas inlet and a height $h$ over a horizontal plane being defined by the bottom, wherein $w_c(l, h) = c \pm \Delta_w \cdot w_{max} \forall l \in [l_1, l_2]$, at a given height $h$ over the bottom. Here, $l_1$ may be the distance of the support opening to a vertical plane defined by the gas inlet, $l_2 = l_1 + l_s$, $l_s$ is the extension of the support opening in the main flow direction, $w_{max} = \max(w_c(l, h))$ and $c$ is a constant. $\Delta_w$ is preferably small, e.g. $\Delta_w \in [0.15, 0]$. Preferred values of $\Delta_w$ are $\Delta_w \in \{0.15, 0.1, 0.075, 0.05, 0.025, 0.01, 0\}$, smaller absolute values of $\Delta_w$ are preferred over greater values. Only to avoid any misunderstanding, the width is measured parallel to the bottom of the process chamber. The bottom of the process chamber is assumed to be at least essentially horizontal.

Particularly preferred is the situation where the changes in the free width are made substantially continuous, $$i.e. \frac{dw_c}{dl}$$

may be finite and its absolute value may preferably be small, for example $$\left|\frac{dw_c(l, h)}{dl}\right| \leq \Delta_w \forall l \in [l_1, l_2],$$

at given height $h$, wherein smaller values of $\Delta_w$ are preferred over greater values. This measure ensures that the flow of the inert gas remains attached to the side walls. Turbulences are reduced and the variations in the flow speed of the inert gas are minimized. Keeping the second derivative low, at least $$\left|\frac{d^2 w_c(l, h)}{dl^2}\right| \leq \Delta_w \forall l \in [l_1, l_2]$$

for the given height $h$, further enhances the inert gas flow.

In other words, (at least) along the entire length of the support opening in the bottom of the process chamber, variations in the free width of the process chamber are minimized. Thus, vortices created by the side walls to the left and to the right of the bottom's support opening are minimized, and preferably even eliminated. In any case, the condition $w_c(l, h) = c \pm \Delta_w \cdot w_{max}$, $\forall l \in [l_1, l_2]$, at a given height $h$ over the bottom ensures that vortices due to changes in the width $w_c(l, h)$ of the process chamber have no significant impact on the flow rate of the inert gas over the support opening. Accordingly, in operation, powder transportation by the air flow can be minimized while at the same time maintaining the flow rate high. To avoid ambiguities, the free width can generally significantly differ from the distance between two opposed side walls of the process chamber, in case an object is positioned for example between a side wall and the support opening. The free width is thus the maximum free passage provided to the inert-gas flow over the support opening at given values of $l, h$.

Small gaps in the side walls (e.g. those configured to allow portions of side walls to be moved relative to each other) shall be considered to be closed by a virtual flush cover when determining the free width. In practice, the gaps may preferably be sealed. The gap can be considered small, if the diameter of vortices of the inert-gas flow created by the gap are smaller than the distance between the second side wall and the support opening. For practical purposes gaps are "small" if their width $g_l$ is lower (or equal) than (or to) 5 mm, i.e. $g_l \leq g_m$, wherein $g_m \in \{6 \text{ mm}, 5 \text{ mm}, 4 \text{ mm}, 3 \text{ mm}, 2 \text{ mm}, 1 \text{ mm}, 0.5 \text{ mm}\}$; again, smaller values are preferred.

Preferably, the free width $w_c(l, h)$ is not only at least essentially constant for a single given height $h$, but for a number of heights in the vicinity of the bottom, for example for any $h \in [h_{min}, h_{int}]$, wherein $0 \leq h_{min} \leq 0.1 \cdot h_{max}$, and $h_{min} \leq h_{int} \leq 0.25 \, h_{max}$ and $h_{max}$ may be the height of the process chamber from the bottom to the ceiling. A change in the width $w_c(l, h)$ as a function of $h$ is possible and may be e.g. used to increase the flow rate of the inert gas in a layer (of non-zero height) at some distance above the bottom, to transport smoke faster to the outlet, once the smoke reached a given height.

The process chamber housing may include a recoater system (or simply recoater)—i.e. at least one recoater—that is movably supported to traverse the support opening in a forward and subsequently in a backward movement and configured to apply a layer of powder onto the area being enclosed by the rim of the support opening. For example, the movable support of the recoater may be provided by at least one guide rail, preferably by a pair of guide rails. These guide rails may be formed e.g. with the use of a slot in the bottom or any other means known in the art. For example, at least one guide rail may be attached to and/or integrated in a front wall and/or a rear wall. A drive may be provided to move the recoater forth and back. In operation, the recoater may apply subsequent layers of powder onto the powder bed on top of the support, when being driven forth and back. In other words, the optional recoater may be movably supported to be repositioned from a first recoater position in the process chamber in a forward direction over the support opening (and thus the optional support) to a second recoater position and in a backward direction from the second recoater position to the first recoater position. The recoater has a front side and a rear side facing in the direction of a forward and backward movement of the recoater, respectively. In other words, preferably, the support opening is in between of the first recoater position and the second recoater position or in even other words, the first recoater position and the second recoater position are preferably at opposite sides of the opening. Particularly preferred, the forward and backward directions are defined to be at least essentially (e.g. within ±15°, ±7.5°, ±5°, ±2.5° or less) perpendicular to the main flow direction.

Only to avoid misunderstandings, it is noted that the first recoater position may as well be referred to as the recoater's first position, its first position or as first position of the recoater. Further, it is noted that the second recoater position may as well be referred to as the recoater's second position, its second position or as second position of the recoater.

In one example, the front side of the recoater, when in the recoater is in its first position, may delimit the free width $w_c(l, h)$, for a range of heights h, wherein $h \in [h_{reb1}, h_{ret1}]$, wherein the $h_{reb1}$ is the height of the front side of the recoater above the bottom (preferably $h_{reb1}=0$) and $h_{ret}$ is a value greater that $h_{reb1}$ ($h_{reb1} < h_{ret1}$). Preferably, $h_{ret1}$ is the height of the recoater. Alternatively or in addition, the rear side of the recoater, when the recoater is in its second recoater position may delimit the free width $w_c(l, h)$, for a range of heights h, wherein $h \in [h_{reb2}, h_{ret2}]$, wherein the $h_{reb2}$ is the height of the front side of the recoater above the bottom (preferably $h_{reb2}=0$) and $h_{ret2}$ is a value greater that $h_{reb2}$ ($h_{reb2} < h_{ret2}$). Preferably, $h_{ret2}$ is the height of the recoater. However it should be noted that the technical effect of avoiding turbulences is obtained already if $h_{ret1}$ ($i \in \{1,2\}$) is sufficiently big (i.e. the recoater is high over the bottom of the process chamber housing) to avoid that vortices being created by changes of the free width above $h_{ret1}$ are sufficiently spaced from the support opening to ensure they do not negatively affect the laminar flow over the support opening and preferably do to collect smoke or other debris being generated during the fusing process.

The first position of the recoater may be inside a first recoater garage (a first garage, for short) of the process chamber housing. The first recoater garage may be a storage volume configured to house the recoater. The first recoater garage may be separated from the process chamber at least by a first movable portion of a first side wall of the side walls enclosing the process chamber. The first side wall's first movable portion is preferably movably supported to be moved between a closed position and an open position, wherein if in the closed position, the first movable portion of the first side wall closes a first garage opening of the first recoater garage in the first sidewall and when in the open position releases the first garage opening. In other words, the first garage may have a first garage's door (a first garage door, for simplicity) provided, e.g., at least by the first portion of the movable portion of the first side wall. Thereby, when the first side wall's first movable portion—the first garage door—is closed, the width $w_c(l, h)$ can be maintained at least essentially constant along the direction of the flow path for a given height h as explained above, as well in the area in front of the garage, provided the first side wall's first movable portion is closed. The first movable portion of the first side wall in its open position does not block the first garage opening and, in this sense, releases the first garage opening. It is assumed that the first side wall is essentially parallel to the main flow direction.

Further, the storage volume of the first recoater garage may be enclosed by at least one first garage wall and/or a first garage ceiling and/or a first garage bottom. For linguistic simplicity, the structure comprising the garage walls, the garage ceiling, and the garage bottom are referred to as garage enclosure or, briefly, enclosure. At least a portion of the garage wall is preferably unitary with and/or firmly or movably attached to and/or a portion of a housing wall.

Similarly, the at least a portion of the garage bottom may be unitary (form a single piece, or even monolithic) with the process chamber bottom and/or be part of the process chamber bottom and/or be attached to the process chamber bottom. In this sense, at least a portion of the structure confining or enclosing or restricting the process chamber may in at least one implementation as well confine the storage volume of the recoater garage. In a particularly preferred example, at least a portion of the garage wall and/or the garage ceiling and/or the garage bottom may be formed or defined by a door panel of the process chamber housing. In this case, opening the housing door at the same time provides access to the garage volume normally confined by the recoater garage and as well to the process chamber. In addition, access to the process chamber is enhanced, as those portions of the recoater garage being formed by the door panel do not restrict the access. Opening the housing door, e.g. by pivoting the housing door panel, in this example further provides access to the garage volume, and if provided therein to a recoater in said garage volume. It should be noted that even a garage door may be movably attached to the housing door panel (e.g. by a hinge and/or a guide rail), wherein the garage door can be opened independently from the rest of the process chamber housing's door panel and provides access from the process chamber to the storage volume of the garage, only. In a preferred example, the garage door, in its closed position is at least essentially parallel to the main flow direction.

The first recoater garage may have a first garage rear wall. A garage rear wall is a garage wall, restricting the garage volume in the direction pointing from the garage opening into the garage volume (and hence, in this particular example, in the direction pointing from the support opening through the garage opening onto the garage rear wall). The first garage's rear wall may be attached to and/or integrally formed with the housing door panel in addition or as an alternative to the garage door. Preferably, the first garage's rear wall is movably attached to the housing door panel, thereby enabling access to the first garage volume while keeping the other part(s) of the housing door panel shut and/or while keeping the garage door shut, but as well to provide an enhanced access to the process chamber volume and/or the first garage volume by opening the housing door panel. On the other hand, opening the first garage's rear wall while maintaining the housing door panel and the first garage opening shut enables to access a recoater in the first garage volume (e.g. for maintenance) while maintaining the inert gas atmosphere in the process chamber volume undisturbed. The inert gas flow may even continue while the garage rear wall is opened, provided the rest of the door panel is kept closed and the garage door is kept closed as well. One may even continue to manufacture in the process chamber while having access to the first garage volume. Further, one may first open the first garage's rear door while maintaining the first garage door shut and the door panel closed. Next, one may insert (or replace) some apparatus, e.g. a repaired recoater, a repair robot or the like into the first garage volume. After this, one may close the first garage's rear wall, preferably replace at least a majority of the air in the first garage volume by an inert gas and subsequently open the first garage wall, thereby enabling the apparatus to access the process chamber volume, without a negative effect on the inert gas atmosphere in the process chamber volume. It comes without saying, that these steps may be controlled at least in part preferably by an electronic circuitry operating as machine control unit, briefly 'by a controller'.

In case the first side wall's first movable portion is closed and the recoater is parked in its first position, the recoater does not affect the laminar inert gas flow and in particular does not provide for any turbulences or vortices which may cause unintended transportation of powder. The first side wall's first movable portion on the other hand enables to temporarily open and thereby release the first garage opening enabling the recoater to move forward towards the recoater's second position and backwards via the first garage opening into the first garage. Thus, the free width constraint as defined above may be temporarily released, to enable recoating of the support.

In a preferred example, the front side of the recoater may be the first movable portion of the first side wall. For example, the first side wall's first movable portion may be attached to or integrally formed by the forward facing side of the recoater. To avoid ambiguities, it is recalled that the forward-facing side of the recoater, may be the side facing towards the recoater's second position, if the recoater is in the recoater's first position. Thus, once the recoater is parked in its first position, the garage may be closed by the recoater itself. No further movable parts are required and no control mechanism for opening the garage door prior to and subsequent to recoating has to be provided. This provides a less expensive and reliable garage door, which may be provided by the first movable portion of the first side wall. In other words, the recoater's front side may close the garage opening, if the recoater is in its first position. The first garage opening may be released, i.e. opened, if the recoater is moved from the recoater's first position towards the recoater's second position, thereby shifting the first sidewall's first movable portion. In the first recoater position, the front side of the recoater is preferably flush with a (e.g. static) portion of the first side wall defining the first garage opening. In other words, the recoater's front side may be the first garage door and/or at least a portion of the first garage door.

Particularly preferred, the first side wall may have a second movable portion, being movably supported to be moved between a closed position and an open position. The second movable portion may keep the first garage opening closed, independently from the recoater's present position. At least, independently from the recoater's present position, if the recoater is not in its first position and/or while transitioning from a position outside the first garage into the first garage or vice versa. For example, the first side wall's second movable portion may be in its closed position, if the recoater is in the recoater's second position and/or at any other position being outside the first garage. Like the first side wall's first movable portion, the first side wall's second movable portion is preferably flush with the (preferably) static portion of the first side wall defining the first garage opening, when the first side wall's second movable portion may be in its closed position. The second movable portion of the first sidewall may be considered as the first garage's second garage door, or to use the prior wording as the 'second first garage door' or 'second first garage's door'.

Generalizing, one may say that the first garage may have at least two first garage's doors (i.e. a first garage('s) door and a second first garage('s) door), being independently able to close the first garage opening, provided the first garage opening is not already closed by the respective other garage door. In other words, at any time at least one of the two garage doors is not in its closed position. As already apparent, the first garage's door can be (at least in part) the first sidewall's first movable portion and the second first garage's door can be at least in part the first side wall's second movable portion. The first garage door may close the first garage if the recoater is in its first position and release the first garage opening if the recoater is not in the recoater's first position. The second first garage door may be configured to close the first garage opening at least if the recoater is in its second position, preferably if the recoater is not inside the first garage. Further, the second first garage door is preferably configured to be open, in case the recoater is in the first garage (i.e. at its first position).

Keeping the first garage opening closed by the first side wall's second movable portion enables to minimize perturbations of the inert-gas flow through process chamber during the recoating process and thereby to increase the gas flow rate during the recoating process. Smoke can be removed efficiently as well during the recoating process, in particular, if the first side wall's first movable portion is attached to or integrally formed by the forward-facing side of the recoater. In particular, in case the recoater is in its second position, the inert gas flow is not perturbed by the first garage opening, in case it is closed by the first side wall's first or second movable portion. In practice small gaps are acceptable.

Preferably, a seal is attached to the first and/or second movable portions and/or the first garage opening defining portion of the first sidewall, wherein the seal(s) is(are) configured to close a gap between first and/or second movable portions and other (e.g. static) portions of the sidewall. For example, the seal may be a brush seal, an elastic profile or the like.

Preferably, the second movable portion of the first side wall is biased towards the second movable portion's closed position. Biasing may be obtained by elastic means, like e.g. a spring, and/or by gravity preloading the respective side wall's second movable portion into its closed position. Biasing simply means that the potential energy of the second movable portion has a maximum in case it is open and a minimum in case is closed. Thus, as soon as the recoater leaves the first garage towards its second position, the second movable portion of the first side wall closes the first garage opening. Only to avoid ambiguities, it is noted that the second movable portion of the first side wall may be the only movable portion of the first side wall. "First" and "second" are thus only used to clearly differentiate between two different movable portions of the first sidewall, i.e. none of the movable portions necessarily requires the respective other, but in a preferred embodiment both are present.

Particularly preferred, the recoater has an abutment configured to entrain the second movable portion of the first sidewall into its open position if the recoater moves in the backward direction through the first garage opening towards the recoater's first position. This mechanism is reliable, sturdy and does not involve complex electronics, software or other means susceptible to failure and thus ensures the second movable portion automatically opens, if the recoater moves into its first position.

For example, the second movable portion of the first sidewall can be movably supported, e.g. by at least one bearing, enabling the second movable portion to translate and/or pivot and/or rotate relative to another, e.g. a static, portion of the first sidewall. The movable support may include at least one bearing configured to enable the second movable portion to move vertically, backwards or sideward or be folded to be thereby moved from the closed into its open position and vice versa. This movement may be driven by the recoater entraining the second movable portion of the first sidewall.

In a preferred example, the process chamber housing may include a dust removal apparatus. The dust removal apparatus may be installed in the first garage and/or be attached to the second movable portion of the first sidewall.

For example the dust removal apparatus may be positioned to contact and/or slide over at least a portion of a surface of the recoater while the recoater enters or leaves the first garage opening, for example when the recoater entrains the second movable portion of the first sidewall into its open position.

The dust removal apparatus may include at least one of a wiper, a brush, a piece of fabric and a suction nozzle configured to remove contaminants from the recoater and/or the floor of the garage. Thereby the effects of unintended dust migration can be reduced.

Particularly preferred, the process chamber housing has a second recoater garage (second garage for short). The second recoater garage may be at the recoater's second position, in other words, the recoater's second position may be in the second garage. Thus, the recoater may travel over the support opening from the first (recoater) garage to the second (recoater) garage, thereby reducing the down time of the laser during recoating, as the recoater can be parked at opposite sides of the support opening without disturbing the inert-gas flow over the support opening. Accordingly, the opening may preferably be in between of the first recoater garage and the second recoater garage, or in other words: The first recoater garage is preferably at the opposite side of the opening than the second recoater garage.

For example, the contour or the second garage opening in the second side wall and the contour of the second side wall's first movable portion may match.

Preferably, the second garage is separated from the process chamber at least by a first movable portion of a second side wall of the side walls. The second garage has a second garage opening being defined by a (e.g. static) portion of the second side wall. As already apparent, the second side wall is preferably the side wall being opposite to the first side wall. The second garage opening may be mirror symmetrical to the first garage opening. The symmetry enhances the inert gas flow and reduces manufacturing costs.

Like the first garage encloses a (first) storage volume, the second garage may enclose a second storage volume. The storage volume of the second recoater garage may be enclosed by at least one second garage wall and/or a second garage ceiling and/or a second garage bottom. For linguistic simplicity, the structure being formed by the second garage wall(s), the second garage ceiling and the second garage bottom are referred to as second garage enclosure or a second enclosure, for short. At least a portion of the second garage wall is preferably unitary with and/or firmly or movably attached to and/or a portion of the housing wall. Similarly, the at least a portion of the second garage bottom may be unitary with the process chamber bottom and/or be part of the process chamber bottom and/or be attached to the process chamber bottom. In this sense at least a portion of the structure confining or enclosing the process chamber, may as well confine the second storage volume. In a particularly preferred example, at least a portion of the second garage walls and/or the second garage ceiling and/or the second garage bottom may be formed by a door panel of the process chamber housing. In this case, opening the process chamber housing door at the same time provides access to the volume normally confined by the second recoater garage and to the process chamber. In addition, access to the process chamber is enhanced, as the portions of the second recoater garage being formed by the door panel to not restrict the access. It should be noted that even a second garage door may be movably attached to the housing door panel (e.g. by a hinge and/or a guide rail), wherein the second garage door(s) can be opened independently from the rest of the process chamber housing's door panel and provides access from the process chamber to the storage volume of the garage, only.

The second side wall's first movable portion may be movably supported to be moved between a closed position and an open position. The second side wall's first movable portion, when in the open position does not block the second garage opening and, in this sense, releases the second garage opening. The second side wall's first movable portion, when in the closed position may close the second garage opening in the second sidewall and when in the open position releases the second garage opening. The second side wall's first movable portion, when in its closed position is preferably flush with the surface of the second side wall next to the second garage opening and faces towards the first side wall. In case the second side wall's first movable portion is closed, the laminar inert gas flow in the process chamber is not or only very little impacted by the transitions from the second side wall's first movable portion to the surrounding portion of the second side wall. The second side wall's first movable portion may be considered as a garage door of the second garage, 'second garage door' for short.

For example, the recoater's rearward facing side may be at least a first part of the second side wall's first movable portion and may close the second garage opening, when the recoater is in the recoater's second position. Thus, the recoater's rearward facing side may be at least a portion of the second garage's door. For example, the contour or the second garage opening in the second side wall and the contour of the second side wall's first movable portion may match. In practice, a gap may be acceptable, provided the gap width is small. The gap can be considered small, if the diameter of vortices of the inert-gas flow created by the gap are smaller than the distance between the second side wall and the support opening.

For example, the second side wall's first movable portion may be attached to or integrally formed by the rearward facing side (rear side) of the recoater. As already apparent, the recoater's rear side is the recoater's surface facing towards the recoater's first position while being parked in the recoater's second position.

Very similar to the first side wall, the second side wall may have a second movable portion, being movably supported to be moved between a closed position and an open position. The second movable portion of the second side wall closes the second garage opening if the second movable portion is in its closed position, and enables access to the second garage and/or the process chamber, if the second movable portion of the second side wall is in its open position. In particular, if the recoater is in the recoater's second position, the second movable portion may be configured to remain in its open position.

Generalizing, one may say that the second garage may have at least two garage doors, being independently able to close the second garage opening, provided the second garage opening is not already closed by the respective other second garage's door. In this example each of the at least two garage doors is configured to fully close the second garage opening, while the respective other garage door remains open. In other words, at least one of the two garage doors is not (i.e. never) in its closed position, while the least two garage doors can be in their respective open position at the same time. As already apparent, the first second garage's door can be (at least in part) the second sidewall's first movable portion and the second second garage's door can be at least in part the second side wall's second movable portion. The first second garage door may close the second garage if the recoater is in its second position and release the second garage opening if the recoater is not in the recoater's second position. The second second garage door may be configured to close the second garage opening at least if the recoater is in its first position, preferably if the recoater is not inside the second garage. Further, the second second garage door is preferably configured to be open, in case the recoater is in the second garage (i.e. at its second position).

The first movable portions of the first and second side walls, while being in their respective closed positions, are preferably symmetric to a vertical plane extending in the main flow direction. Similarly, the first and second garage openings are preferably symmetric to said vertical plane. This eases manufacturing and keeps the inert-gas flow at least essentially symmetric.

For example, the process chamber housing may include at least one raw material dispenser. The raw material dispenser may have at least one raw material outlet positioned above the recoater's first position in the first garage and/or above the recoater's second position in the second garage, thereby being configured to provide the optional recoater with raw material while being parked in the first and/or second recoater position(s), respectively.

Particularly preferred, the open position of the second movable portion of the first sidewall is below the garage opening, forms in its open position at least the portion of a garage floor and/or of a garage wall. In any of these cases, the first and or second side wall's second movable portion, when in their open positions, are not positioned in between of the optional raw material outlet and the corresponding refill opening of the optional recoater, thereby enabling to refill the recoater from the top while being parked in the first garage and/or second garage.

Preferably, the first and/or second side wall(s) may extend at least essentially parallel to the main flow direction. This provides for an at least essentially constant free width $w_c(l, h)$ for a given h. At least essentially parallel (perpendicular) means that parallel (perpendicular) is preferred, but small deviations, e.g. ±15°, ±7.5°, ±5°, ±2.5°, ±1° or less (preferably ±0°) can be accepted.

The above-described measures, in particular the constraint on the free width $w_c(l, h)$ further enables to reduce the width and thereby the footprint of the process chamber housing. Manufacturing and operating costs can be reduced. For example, the distance from the support opening to the first and second side walls may be reduced e.g. to 5 cm or less preferably to 4 cm, to 3 cm, to 2 cm to 1 cm or less. The optimum distance is about 1.25 to 1.5 times the thickness of the laminar boundary layer ($d_{lbl}$) adhering to the first and second side walls. Theoretically, the optimum distance would be the thickness of the laminar boundary layer, however in practice minor perturbations of the laminar flow cannot be entirely avoided, for example because small gaps between static and movable portions of the first and second side walls cannot be avoided. Even optional sealants may provide for changes of the width $w_c(l, h)$. In a preferred example, the free width obeys the relation $w_s - d_m \leq w_c(l, h) \leq w_s + d_m \forall l \in [l_1, l_2]$, wherein $1.25 \cdot d_{lbl} \leq d_m \leq 1.5\ d_{lbl}$ at a given height h. The thickness of the laminar boundary layer $d_{lbl}$ is a function of flow velocity, distance from the leading edge and gas properties; it increases with the flow speed in the center of the process chamber. For practical purposes $d_m$ can be selected to be lower equal to 6 cm, e.g. $d_m \in \{6\ \text{cm}, 5\ \text{cm}, 4\ \text{cm}, 3\ \text{cm}, 2\ \text{cm}\}$.

In a preferred example, $d_m$ may be selected lower than ¼ of the width of the support opening $w_s$ and larger than ¹⁄₂₅ of the width of the support opening, i.e. preferably $$\frac{1}{25} \cdot w_s \leq d_m \leq \frac{1}{4} \cdot w_s, \text{ e.g. } d_m = \frac{1}{5} \cdot w_s, d_m = \frac{1}{10} \cdot w_s, d_m = \frac{1}{15} \cdot w_s.$$

In a preferred example, the floor may have at least one additional opening between the support opening and the first sidewall and/or between the support opening and the second sidewall. The distance between the additional opening and the support opening is preferably in between of 10 cm and 0.5 cm. A preferred value is 5 cm±0.5 cm or bigger. Other reasonable distances are 4 cm, 3 cm, 2 cm, 1 cm or less. Particularly preferred, the floor does not comprise an opening between the support opening and the first sidewall and/or does not comprise an opening between the support opening and the second sidewall.

Preferably, at least a portion of the rear wall is inclined towards the gas inlet. In other words, the distance of said portion of the rear wall to a vertical plane being defined by the front wall and/or by the gas inlet decreases with increasing height h over the bottom. This portion of the rear wall is preferably a portion above the gas outlet. The gas outlet may as well be at least in part in said inclined portion. These measures enable to reduce the vertical extension of the gas outlet without compromising the gas flow in the process chamber. In particular, if the gas outlet is in the lower half, preferably in the lower third, quarter or fifth of the rear wall, the inclined portion provides for an inert gas flow having a downward component. This downward component helps to reduce condensation of smoke on the ceiling. This reduces the scatter of radiation energy provided via a window in the ceiling to the powder in the support opening of the bottom. In particularly preferred example, at least a portion of the gas inlet is located in the upper half, preferably in the upper third or upper quarter or upper fifth of the process chamber. In a particularly preferred example, the gas inlet and/or the gas outlet extends over at least 75% (even more preferred in increasing order: 80%, 90%, 95%, 100%) of the height of the front wall.

As already indicated above, in a preferred example, the process chamber housing has at least one housing door enabling easy access to the space enclosed by the walls, i.e. to the process chamber. The at least one housing door is preferably installed above the first garage opening and/or above the second garage openings. The at least one housing door may form another portion of the first side wall and/or of the second side wall, respectively. Opening the housing door enables to access the process chamber, e.g. for maintenance purposes. The term housing door is used only to verbally distinguish a door in at least one of the walls of the process chamber housing from a garage door.

In a preferred example, the first garage door and/or the above second garage door is movably attached to the at least one housing door. More precisely worded, at least one of the garage doors may be movably attached to a door panel of the housing door. In addition, or alternatively at least one of the above explained garage walls may be attached to the housing door panel as well. Each of these measures improves access to the process chamber, and in particular to an optional recoater, or any other means in the respective garage.

The at least one housing door can be retrofitted. In this case the process chamber housing has a first (inner) door and a second outer door with a space in between, wherein at least a portion of the bottom of the space between the two doors may be a ceiling of a first or a second recoater garage. The piece forming the bottom of the space and the ceiling of the garage is not necessarily the same, but the dimension $d_b$ of the bottom of the space measured perpendicular to the main flow direction is preferably at least the width of a garage $w_g$ being positioned below the space, wherein $w_g$ is measured as well perpendicular to the main flow direction, minus the width of the inner door $w_{di}$, i.e. $d_b \geq w_g - w_{di}$. Having two doors simplifies the housing, as the doors may serve different purposes. The outer door may have all the safety features required and enclose the process chamber at least essentially hermetically. The outer door may be configured to be locked during additive manufacturing, in particular during fusing of powder. The inner door may be much simpler and may be configured to guide the inert gas flow from the front to the rear wall. In an example, the inner door may be a glass pane being hinged relative to side walls, e.g. relative to the front and/or rear walls.

The corresponding additive manufacturing apparatus for manufacturing three-dimensional objects from a raw material, has a process chamber housing as described above, a radiation source configured to fuse powder particles on a support in the support opening of the bottom and an inert gas source being in fluid communication with gas inlet. Further, the apparatus may include a controller optionally configured to control the position of the support and/or the movement of the optional recoater and/or the position of movable portions of the first and second side walls and the direction and/or the intensity of a beam emitted from the radiation source (e.g. of a laser beam being emitted by a laser).

Only to avoid misunderstandings, in the field of additive manufacturing inert gases are gases that do not react under the process conditions with the raw material, i.e. in the example of powder fusing with the powder. Typical examples are Argon and the other noble gases, Nitrogen and of course mixtures thereof.

The term powder is herein used a synonym for a raw material powder. The powder preferably has a grain diameter $\varphi_g \leq 100$ µm. For example, the powder may be of a metal, an alloy or a blend of metals and/or alloys. However, the invention is not limited to these powders, alternatively the powder may be a thermoplastic powder, of glass and/or of a ceramic precursor or of mixtures of all these materials.

The word "fusing" is herein used as a part pro toto for any mechanism enabling to adhere powder grains to each other by irradiating the powder grain with an energy beam to thereby form a workpiece. The powder grains may be sintered, welded, glued or be attached to each other by other mechanism.

Movable support can be provided by at least one rotary bearing and/or at least one linear bearing, e.g. by at least one hinge and/or a telescopic joint.

Herein some technical/structural details have been explained only for the first garage, but it is clear that in the corresponding sentences the term "first" can be replaced by the term "second", to address the second garage. Similarly, only for simplicity the invention has been described based on a single housing door, but of course, there can be second housing door as well. Structures confining an optional second garage, may be attached to and/or integrated in the optional second housing door, as explained in more detail above as well for the first garage and the (first) housing door.

BRIEF DESCRIPTION OF THE DRAWINGS

In the following, the invention will be described by way of example, without limitation of the general inventive concept, on examples of embodiment and with reference to the drawings.

Figure 1:
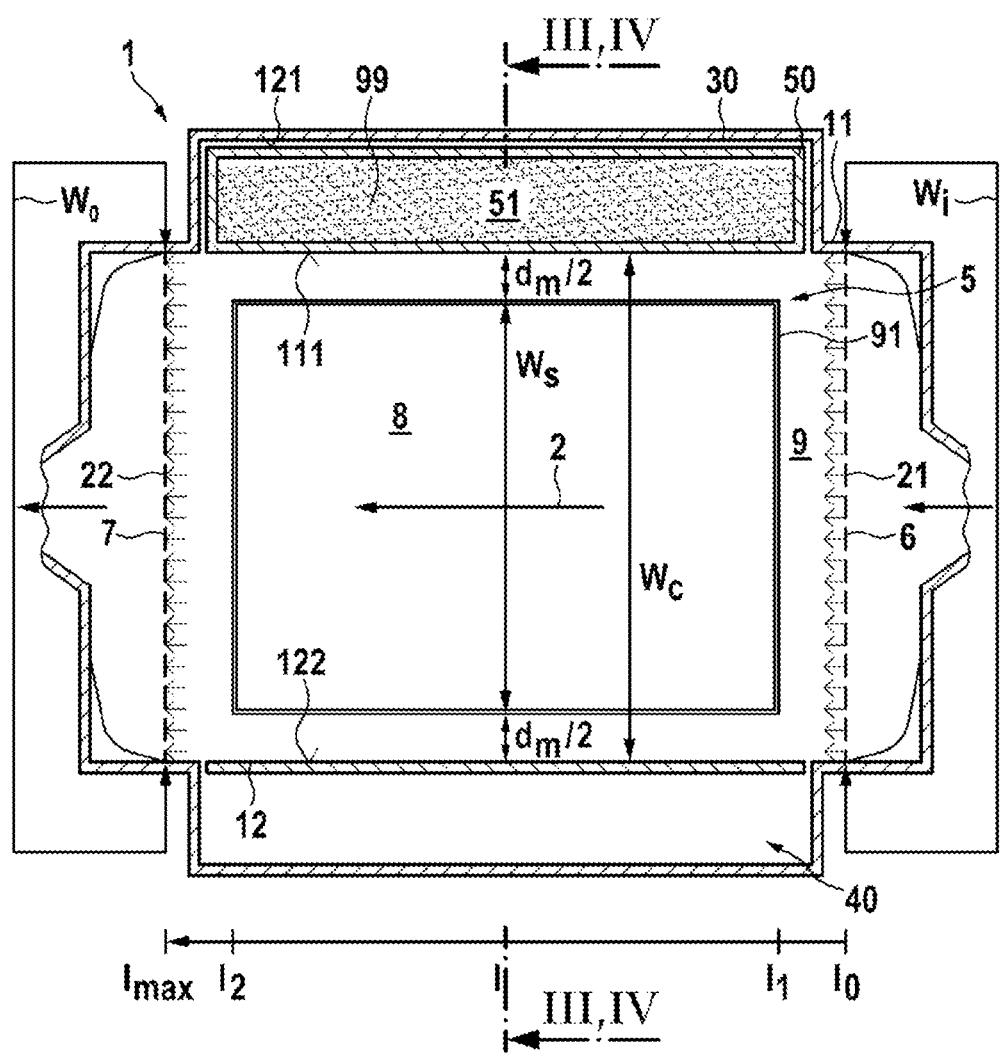
FIG. 1 is a simplified sketch of a sectional view of an embodiment of a process chamber housing.

Generally, the drawings are not to scale. Like elements and components are referred to by like labels and numerals. For the simplicity of illustrations, not all elements and components depicted and labeled in one drawing are necessarily labels in another drawing even if these elements and components appear in such other drawing.

While various modifications and alternative forms, of implementation of the idea of the invention are within the scope of the invention, specific embodiments thereof are shown by way of example in the drawings and are described below in detail. It should be understood, however, that the drawings and related detailed description are not intended to limit the implementation of the idea of the invention to the particular form disclosed in this application, but on the contrary, the intention is to cover all modifications, equivalents and alternatives falling within the spirit and scope of the present invention as defined by the appended claims.

DETAILED DESCRIPTION

Figure 2:
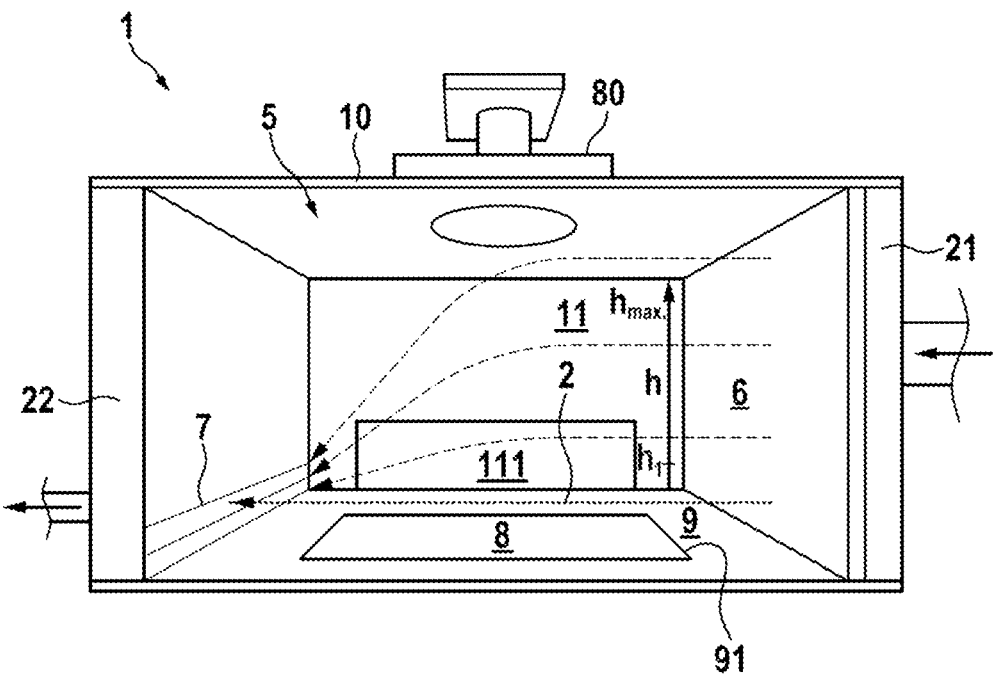
FIG. 2 is another simplified sketch of an embodiment of a process chamber housing.

FIG. 1 shows a simplified sketch of a process chamber housing 1 as viewed at a position approximately corresponding to the height $h_1$ as shown in FIG. 2. FIG. 2 is a perspective side view of a process chamber housing 1 of FIG. 1, but in which perspective side view a second side wall 12 (expressly shown in FIG. 1) has been removed. Together, FIGS. 1 and 2 illustrate an embodiment of the process chamber housing. The process chamber housing 1 has a first sidewall 11 and a second side wall 12 being opposed to each other and having a length $l_{max}$. Further, the process chamber 5 (FIGS. 1 and 2) is delimited by a front wall 21 and by a rear wall 22. In this example, the contour of each of the four walls 11, 12, 21 and 22 are in a plane, at least with respect to the side walls 11, 12 this is a preferred example, other shapes are not excluded. A bottom 9 with a support opening 91 for an optional support 8 delimits the process chamber 5 downwards and a ceiling 10 (see FIG. 2) upwards. The first sidewall 11 is movably attached, for example hinged, to a support structure, e.g. to one of its neighbouring walls 21 or 22. Hence, the first sidewall is a door panel of the process chamber housing 1, enabling access to the process chamber 5. In an alternative example, the door panel may be formed by a portion of a side wall 11. The latter may be easier to manufacture, but provides a smaller door opening, i.e. accessibility of the process chamber 5 is reduced compared to the depicted option.

As can be seen in FIG. 1 and FIG. 2, the front wall 21 has a gas inlet 6 configured to provide a main gas flow in a main-flow direction 2 (indicated by arrow 2) towards a gas outlet 7 in the rear wall 12. In the structure illustrated in FIGS. 1 and 2, the gas inlet 6 is a porous material extending over the entire surface of the front wall, however it should be noted that this is only a preferred example of a gas inlet 6. Other gas inlets configurations can be used as well. In particular, the gas inlet may cover or form only at least one sub portion of the front wall. For example, a particular gas inlet can be formed by a one or more slots the front wall. In addition, some examples may also include gas inlet openings in the ceiling 10 of the process chamber 5 for providing a support gas flow. The distance between the front wall and the rear wall defines the length $l_{max}$ of the process chamber (see FIG. 1). The distance from the front wall 21 is thus measured parallel to the main-flow direction 2 as indicated by the axis I, having $l_o$=0 at the vertical plane through the bottom of the front wall 21. The gas inlet 6 and the gas outlet 7 each have a width $w_i$ and $w_o$, respectively, being measured at least essentially perpendicular to the main-flow direction 2 (see FIG. 1).

In these examples, the distance between the first and second side walls 11, 12 is the free width $w_c(l, h)$ enabling an inert gas flow being indicated in FIG. 1 by small parallel arrows leaving the gas inlet 6 and entering the gas outlet 7. Thus, the gas flow transports smoke, that is generated during fusing of powder on top of the support 8, towards the gas outlet 7 in the rear wall 22. In general, $w_c$ is a function of the distance l from the front wall 21 and the height h over the bottom (see FIG. 2), i.e. $w_c=w_c(l, h)$. Notably, in the example shown in FIGS. 1, 2, 3, and 4, the free width is substantially constant (neglecting minor gaps in the side walls 11, 12), i.e. $w_c(l, h)=c=w_{max}$, $\forall l \in ]l_0, l_{max}[$, at a given height h. As explained above, this is a preferred example, in practice small variations $\Delta_w$ can be accepted, i.e. $w_c(l, h)=c \pm \Delta_w \cdot w_{max} \forall l \in [l_1, l_2]$.

Due to the at least essentially constant free width $w_c(l, h)$ of the process chamber, the distances $d_m/2$ between the support opening 91 and first and second side walls 11, 12 can be rather small. It should be noted that in these preferred examples, the distances $d_m/2$ are not drawn to scale but have been enlarged.

Each side wall 11, 12 has first and second movable portions 111, 112, 121 and 122, respectively, wherein in the sketch of FIG. 1 only the first side wall's first movable portion 111 and the second side wall's first and second movable portions 122 are shown, indicated as surfaces. The remaining movable portions 112 and 121 are shown in FIGS. 3 and 4.

Figure 3:
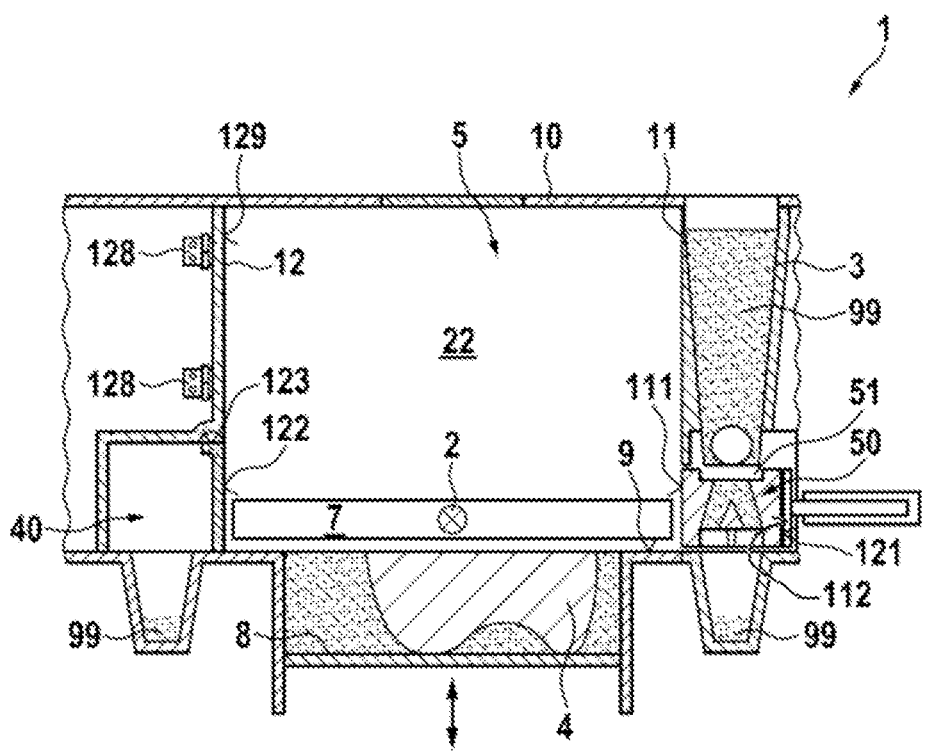
FIG. 3 presents schematically a sectional view of an embodiment of a process chamber housing.
Figure 4:
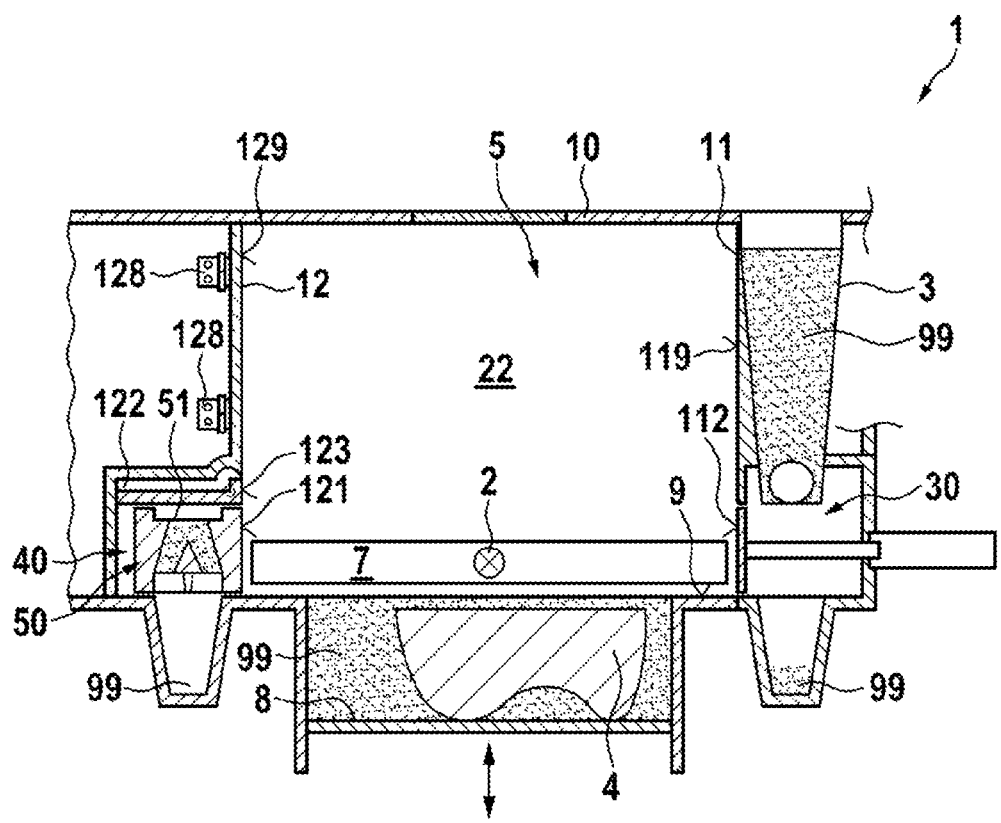
FIG. 4 shows a simplified sketch of a sectional view of the embodiment of the process chamber housing of FIG. 3.

FIG. 3 and FIG. 4 show simplified cross sectional views, of the a process chamber housing 1 very similar to the process chamber housing of FIG. 1 and FIG. 2, wherein the section plane is at least essentially perpendicular to the flow direction 2 as depicted in FIG. 1 and somewhere in between of $l_1$ and $l_2$, e.g. approximately at the planes III and IV being indicated in FIG. 1. Thus, the description of FIG. 1 and FIG. 2 can be read on FIG. 3 and FIG. 4 as well.

As shown in FIG. 1, FIG. 3 and FIG. 4, the process chamber housing includes a recoater 50 having a raw material reservoir 51. In FIG. 1 and FIG. 3, the recoater 50 is shown in an initial position, as well referred to herein as the recoater's first position. In this first recoater position, the recoater 50 is positioned in an optional first recoater garage 30. The first recoater garage 30 is separated from the process chamber 5 by a first movable portion 111 of the first sidewall 11. Thus, the first movable portion 111 of the first sidewall 11 is shown in the first sidewall's first movable portion's closed position, essentially closing the first garage opening in a static portion of the first sidewall 11 (see FIGS. 1 and 3). A second movable portion 112 of the first sidewall 11 may be stowed in the first garage 30 at the rear side 121 of the recoater 50 and thus in the first sidewall's second movable portion's open position. Preferably, the second movable portion 112 of the first sidewall 11 is biased toward its closed position, being shown in FIG. 4.

Still in reference to FIG. 3, the process chamber housing 1 further includes a second recoater garage 40, being empty in FIG. 3. The second recoater garage 40 may as well be separated from the process chamber 5 by a movable portion 122 of the second side wall 12. We will refer to this movable portion 122 as the second sidewall's second movable portion. The second side wall 12 has as well a first movable portion 121, which is integrally formed by the rear side of the recoater 50 and is shown in FIG. 3 in its open position, as it is stowed in the first garage 30. As indicated by sketched hinges 128, the entire side wall 12 is optionally movably attached to a support structure of the process chamber housing 1. The side wall 12, or at least a portion thereof thus forms a door panel 129. Further, portions of the confinement of the second recoater garage 40 are formed by the door panel 129 as well, and hence pivot with the door panel 129, if it is opened to enable access to the process chamber 5. When all garage doors are closed, the confinement is complete to avoid inert gas to leak through the garage.

After the upper layer of the raw material 99 has been partially fused to a part of a workpiece 4, the support 8 is lowered by the thickness of a layer of raw material 99. Next, the recoater 50 is moved from its first position to its second position, i.e. into the second garage 40, thereby applying a new layer of raw material into the support opening 91. Whereas FIG. 3 shows the recoater 50 in its first position, FIG. 4 shows the recoater 50 after having moved over the support opening 91 into its second position.

As can be seen in FIG. 4, the first sidewall's second movable portion 112 is shifted horizontally into the first garage opening into the first sidewall's second movable portion's 112 closed position. The first sidewall's second movable portion 112 is horizontally movable, e.g. supported by a linear bearing enabling an at least essentially horizontal movement of the first sidewall's second movable portion 112 from its open position (FIG. 3) into its closed position (FIG. 4) and back into its open position (cf. FIGS. 6 and 7). The first sidewall's second movable portion 112 is biased into its closed position. Thus, as soon as the recoater 50 is moved forward towards the recoater's second position, the first sidewall's second movable portion 112 follows the recoater 50 until the first sidewall's second movable portion 112 reaches it closed position.

Once the recoater 50 approaches the second garage opening, it abuts the second side wall's second movable portion 122, thereby moving second movable portion 122 into its closed position (by moving on into the recoater's second position) as shown in FIG. 4. As shown in this example, it is advantageous if the second side wall's second movable portion is hinged relative to static portion of the second side wall 12, wherein the pivot axis is at least essentially parallel to the main flow direction 2 and above the recoater's top. Thereby, the raw material reservoir 51 of the recoater 50 is closed by the second side wall's second movable part. Superfluous raw material 99 may fall into a tray 45 (cf. FIGS. 8 and 9) in the second garage's bottom.

As shown in FIG. 4, the second garage opening may be closed by the first movable portion 121 of the second side wall 12. The first movable portion 121 of the second side wall 12 may be integrally formed or be attached to the rear side of the recoater 50. Another portion of the second garage opening may be closed by a third movable portion 123 of the second side wall 12, being moved into the garage opening and thus into its respective closed position, when the second movable portion 122 is moved into its open position. In this optional example, the third movable portion 123 is provided by a free leg being attached to an end of the second movable portion 122 of the second side wall. Thereby gaps are minimized. Alternatively, the second movable portion 122 could be movably supported differently, e.g. by at least one linear bearing as shown for the second movable portion 112 of the first side wall 11. This has the advantage of less different parts but increases the footprint of the process chamber housing 1.

Once the newly added layer of raw material has been at least partially fused to the workpiece 4 and the support has been lowered, the recoater 50 maybe moved backwards into its first position, thereby applying a next layer of raw material 99 onto the support. While the recoater 50 passes the second garage opening, the second movable portion 122 of the first second wall 12 enters its closed position. For example, second movable portion 122 of the second side wall 12 may simply pivot, e.g. by gravity into its closed position. As soon as the recoater 50 reaches the first garage opening, it retracts the second movable portion 112 of the first side wall into its open position, while the first movable portion 111 of the first sidewall 11 closes the first garage opening (as shown in FIG. 3). The optional raw material dispenser 3 being positioned above the recoater 50 may replenish the recoater's raw material reservoir 51 and the cycle may be repeated until the workpiece 4 is finished.

Figure 5:
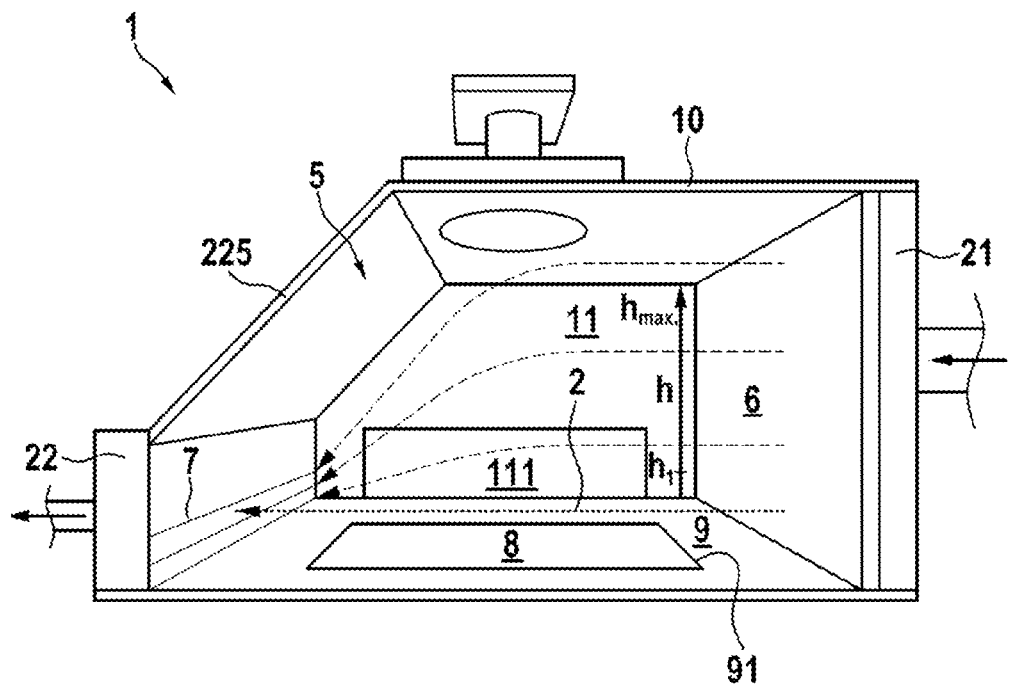
FIG. 5 shows a simplified sketch of a related implementation of the process chamber housing.

The process chamber housing 1 in FIG. 5 is very similar to the process chamber housing 1 in FIG. 2. (That is, the description of FIG. 2 can be applied to FIG. 5 as well and FIG. 2 could be replaced by FIG. 5, i.e. FIG. 5 has to be read in the context of FIGS. 1, 3 and 4, as well.) Different from the example of FIG. 2, the rear wall 22 of the process chamber housing 1 has an optional inclined portion 225. The optional inclined portion 225 is a guide plate 225 being positioned above the outlet opening 7. The guide plate delimits the process chamber in the flow direction 2 and is thus a part of the rear wall 22. The guide plate 225 connects a non-inclined portion of the rear wall 22 with the ceiling 10. As apparent from FIG. 5, the inclined portion 225 (i.e. the guide plate) is inclined towards the front wall 21. In other words, with increasing height, the distance between the rear wall 22 and the front wall decreases. In operation the inclined portion 225 thus provides for an (inclined) downdraft a without dead volume. Further, the downdraft (see dashed lines) removes up drafting smoke, which cannot be entirely avoided due to the heat being released by the fusion process.

Figure 6:
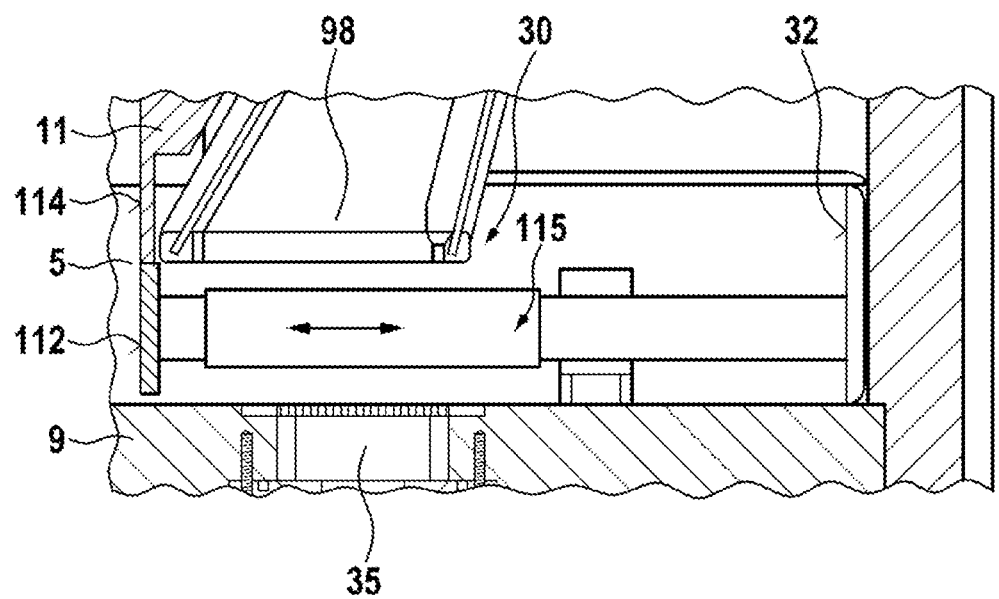
FIG. 6 shows a sectional view of a detail of a first garage without a recoater.

FIG. 6 shows a sectional view of a detail of an empty garage 30, i.e. of a first garage without recoater 50, which could be parked and refilled in the garage 30. The first garage 30 has a space being delimited towards the process chamber by a first sidewall 11 of the process chamber 5 (cf. FIGS. 1 to 5). The bottom plate, forming the bottom 9 of the process chamber 5 as shown in FIGS. 1 to 5 extends into the first garage 30, providing a garage bottom. In the depicted preferred example, the garage bottom has raw material fall through removal tray 35, removal tray 35 for short, preventing the accumulation of raw material in the first garage 30. Above the removal tray 35 is an outlet 98 of a dispenser 3 (see FIGS. 2 and 5), as well referred to as raw material dispenser outlet 98. In the depicted preferred example, the first position of the recoater 50 is in between of the removal tray 35 and the raw material dispenser outlet 98, as shown in FIG. 7.

A static portion 114 of the first sidewall 11 defines the first garage opening. The first garage opening may be closed by a first movable portion 111 and/or by a second movable portion 112 of the first sidewall. In FIG. 6, the first garage opening is shown closed by the optional second movable portion 112 of the first sidewall 11. The second movable portion 112 of the first side wall 12 may be movably supported enabling the second movable portion 112 to be moved from its closed position being shown in FIG. 6 into an open position as shown in FIG. 7. In a preferred example, the second movable portion 112 of the first side wall 11 is supported by a linear bearing, enabling a horizontal movement of the second movable portion 112 towards a rear end 32 of the first garage 30 as shown in FIG. 7. As usual, the rear end 32 is the end opposite of the garage opening.

Figure 7:
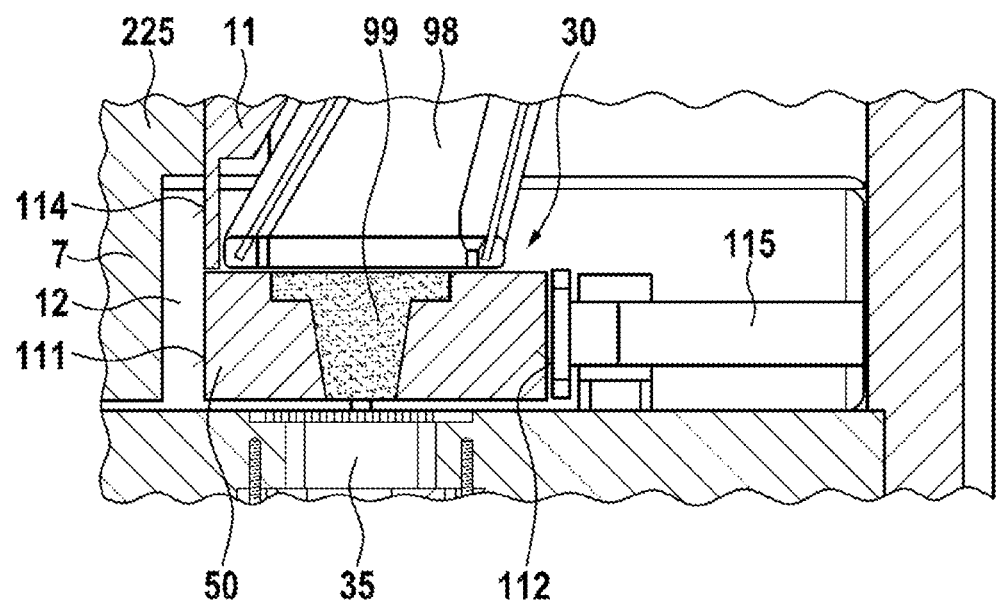
FIG. 7 shows a sectional view of a detail of the embodiment of the garage of FIG. 6 with a recoater.

FIG. 7 shows a sectional view of a detail of the first garage of FIG. 6 after a recoater 50 has been parked in the first garage, i.e. in the recoater's first position. As can be seen, the front surface of the recoater 50 may close the first garage opening and may thus provide the first movable portion 111 of the first side wall 11. The rear surface of the recoater 50 provides an abutment configured to entrain the second movable portion 112 of the first sidewall, if the recoater 50 is moved into the first garage 30. In a preferred example, the second movable portion of the first sidewall 11 is biased, e.g. spring loaded, towards its closed position. Alternatively or additionally, the second movable portion includes a first first coupling portion configured to releasably couple mechanically with a first second coupling, wherein the two coupling portions are configured to transmit a pulling force from the recoater 50 to the second movable portion 112. In this example, the movement of the recoater out of the first garage entrains the second movable portion into its closed position. In the closed position the coupling opens and the recoater may continue its moment towards the second side wall 12. The coupling may be a positive locking and and/or magnetic coupling. Thus, in the depicted preferred example, the first garage opening is only open, while the recoater 50 passes first garage opening. Perturbations of the inert gas flow (cf. FIGS. 1 to 5) by the first garage opening are thus limited to a minimum.

Figure 8:
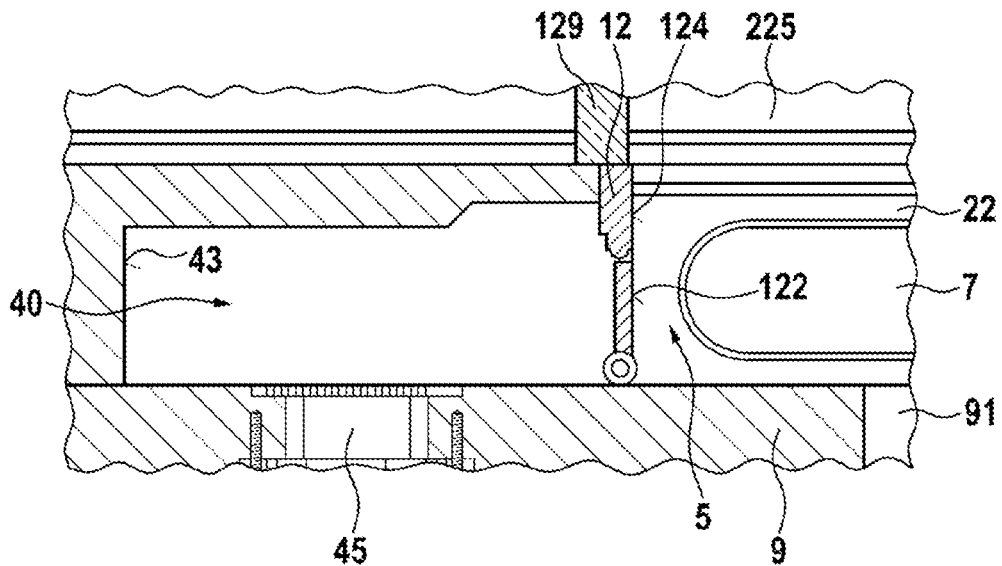
FIG. 8 is a sectional view of a detail of an embodiment of the first garage without a recoater.
Figure 9:
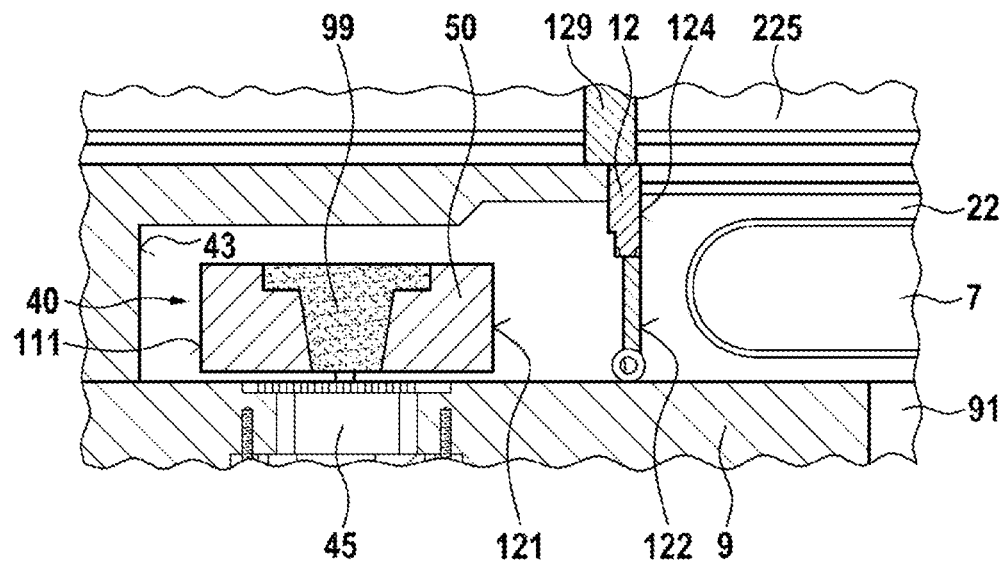
FIG. 9 shows a sectional view of a detail of the garage of FIG. 8 with a recoater.

While the recoater 50 is parked in the first garage 30 in the first recoater position it may be refilled with raw material 99. A second garage 40 is at the opposite side of the process chamber 5, as shown in FIGS. 8 and 9. Similarly to the first garage 30, the second garage 40 has a space being delimited towards the process chamber 5 by a second sidewall 12 of the process chamber 5 (cf. FIGS. 1, 3 to 5). The bottom plate, forming the bottom 9 of the process chamber 5 as shown in FIGS. 1 to 5 may extend as well into the second garage 40, providing a garage bottom. The second garage bottom has second raw material fall through removal tray 45, removal tray 45 for short, preventing the accumulation of raw material in the second garage 30. A raw material dispenser 3 with a raw material dispenser outlet 98 could be realized above the second garage 40, as well, but is preferably omitted as shown.

A static portion 124 of the first sidewall 12 defines a second garage opening. The second garage opening may be closed by a first movable portion 121 and/or by a second movable portion 122 of the second sidewall 12. In FIG. 8, the second garage opening is shown closed by the optional second movable portion 122 of the second side wall 12. The second movable portion 122 of the second side wall 22 is movably supported enabling the second movable portion 122 to be moved from its closed position being shown in FIG. 8 into an open position as shown in FIG. 9. Thus, in this example, the second movable portion 122 is pivotably supported relative to the garage opening defining portion 124 of the second side wall 12. Moving the recoater 50 further towards the rear end 43 of the second garage 40 may position the recoater right above the second garage's removal tray 45, which is in this example the recoater's second position. In this second recoater position, the second movable portion 122 of the second side wall 12 pivots back into its closed position (FIG. 9). This closed position is at least essentially flush with the second garage opening defining portion 124 of the second side wall 12 and thus turbulences or other perturbations of the inert gas flow are minimized. Alternatively, the second recoater position of the recoater 50 could be shifted slightly to the process chamber 5, wherein the backward facing surface 122 (indicated by a dashed 'tick line') of the recoater 50 provides a first movable portion 121 of the second side wall 12, being at least essentially flush with the second side wall's second garage opening defining portion 124 (see FIG. 10). In this case, the second removal tray 45 is preferably shifted as well, so that it is under the recoater 50 in its second end position.

Figure 10:
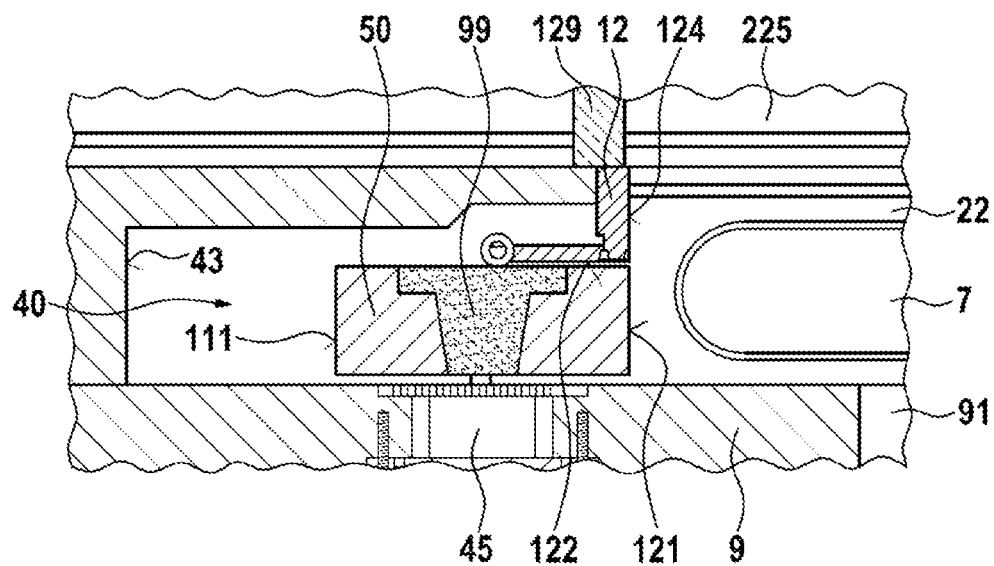
FIG. 10 is a sectional view of a detail of an embodiment of the garage similar to the one of FIGS. 8 and 9 with a recoater.

As can be seen in FIGS. 8 to 10, above the second garage opening defining portion 124 of the second wall is a movable door 129, i.e. a door panel 129, forming a part of the second wall 12 and enabling to access to process chamber 5. In FIGS. 1, 2, 3, 4, and 5 this door has been omitted (not indicated) for simplificy of illustration and is at least essentially flush with neighbouring portions of the second side wall 12.

In the Figures, portions of walls are indicated by 'ticks' referring to the process chamber facing surface of the respective portion.

It will be appreciated to those skilled in the art having the benefit of this disclosure that this invention is believed to provide a process chamber housing for an additive manufacturing apparatus, an additive manufacturing apparatus and a method for operating these. Further modifications and alternative embodiments of various aspects of the invention will be apparent to those skilled in the art in view of this description. Accordingly, this description is to be construed as illustrative only and is provided for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

For the purposes of this disclosure and the appended claims, the use of the terms "substantially", "approximately", "about", "essentially" and similar terms in reference to a descriptor of a value, element, property, or characteristic at hand is intended to emphasize that the value, element, property, or characteristic referred to, while not necessarily being exactly as stated, would nevertheless be considered, for practical purposes, as stated by a person of skill in the art. These terms, as applied to a specified characteristic or quality descriptor means "mostly", "mainly", "considerably", "by and large", "to great or significant extent", "largely but not necessarily wholly the same" such as to reasonably denote language of approximation and describe the specified characteristic or descriptor so that its scope would be understood by a person of ordinary skill in the art. In one specific case, the terms "approximately", "substantially", "essentially" and "about", when used in reference to a numerical value, may represent a range of plus or minus 20% with respect to the specified value, more preferably plus or minus 10%, even more preferably plus or minus 5%, most preferably plus or minus 2% with respect to the specified value. As a non-limiting example, two values being "substantially equal" to one another may imply that the difference between the two values may be within the range of +/−20% of the value itself, preferably within the +/−10% range of the value itself, more preferably within the range of +/−5% of the value itself, and even more preferably within the range of +/−2% or less of the value itself.

LIST OF REFERENCE NUMERALS

1 process chamber housing
2 gas flow direction, longitudinal axis
3 raw material dispenser
4 workpiece/adhered moieties of raw material
5 process chamber
6 gas inlet
7 gas outlet
8 support
9 bottom
91 support opening in bottom 9, configured to receive support 8
10 ceiling
11 first sidewall
111 first movable portion of first sidewall
112 second movable portion of first sidewall
114 first garage opening defining portion of first sidewall
119 housing door (part of first wall 11 or entire first wall 11)/door panel
12 second sidewall
121 first movable portion of second sidewall
122 second movable portion of second sidewall
123 second movable portion of second sidewall
124 second garage opening defining portion of second sidewall
128 hinge
129 housing door (part of second wall 12 or entire second wall 12)/door panel
21 front wall
22 rear wall
225 guide plate
30 first garage (optional)
32 rear end of first garage
35 raw material removal duct
40 second garage (optional)
42 rear end of second garage 45 raw material removal duct
50 recoater
51 recoater's reservoir
80 beam generating unit/laser unit
98 raw material dispenser outlet
99 raw material/powder
l distance from vertical plane through the bottom of the front wall
$w_s$ width of the opening and/or of the support
$w_c(l, h)$ width of the chamber
$w_i$ width of the gas inlet
$w_o$ width of the gas outlet

The invention claimed is:

1. A process chamber housing for an additive manufacturing apparatus, the process chamber housing comprising a process chamber, wherein the process chamber housing has at least:
- a bottom of the process chamber, a ceiling of the process chamber, and side walls of the process chamber that jointly enclose a volume of the process chamber,
- a gas inlet in a front wall of the side walls, the gas inlet configured to provide a gas flow into the process chamber,
- a gas outlet in a rear wall of the side walls, the gas outlet configured to release the gas flow out of the process chamber,
- a first recoater garage confining a first storage volume of the first recoater garage that is dimensioned to house a recoater at a first recoater position, wherein:
- at least one of the side walls of the process chamber has at least one housing door enabling access to the process chamber or is the housing door enabling said access,
- the housing door has a housing door opening and a housing door panel,
- the first storage volume of the first recoater garage is enclosed by at least one first garage wall and/or a first garage ceiling and/or a first garage bottom,
- the bottom of the process chamber has a support opening configured to receive a movable support for supporting a three-dimensional object,
- the gas inlet and the gas outlet are positioned at opposite sides of the support opening and face towards each other, thereby being configured to provide the gas flow in a main flow direction from the gas inlet over the support opening to the gas outlet,
- at least a portion of the at least one first garage wall and/or the first garage ceiling and/or the first garage bottom is formed by the housing door panel, the process chamber housing further comprising:
- at least one recoater that is movably supported and configured to move in a forward direction from the first recoater position over the support opening to a second recoater position and in a backward direction from the second recoater position to the first recoater position,
- wherein said at least one recoater has a front side facing in the forward direction and a rear side facing in the backward direction,
and
- a second recoater garage, separated from the process chamber at least by a first movable portion of a second side wall of the side walls wherein:
- the second recoater position is in the second recoater garage,
- the first movable portion of said second side wall is movably supported to be moved between a first closed position and a first open position,
- when in the first closed position, the first movable portion of the second side wall closes a garage opening in the second sidewall, and
- when in the first open position, the first movable portion of the second side wall releases the garage opening in the second sidewall,
and
- wherein the rear side of the at least one recoater forms at least a first part of the first movable portion of the second side wall and is configured to close the second garage opening when the at least one recoater is in the second recoater position.

2. The process chamber housing of claim 1, wherein
- the first recoater garage is separated from the process chamber at least by a first movable portion of a first side wall of the side walls of the process chamber,
- the first movable portion of said first side wall is movably supported to be moved between a second closed position and a second open position,
- when in the second closed position, the first movable portion of said first side wall closes a garage opening in the first sidewall and thereby separates the first recoater garage from the process chamber, and
- when in the second open position, the first movable portion of said first wall releases the garage opening in the first sidewall.

3. The process chamber housing of claim 1, wherein the front side of the recoater is the first movable portion of the first side wall,
- wherein the front side closes the garage opening, if the recoater is in the first recoater position and releases a garage opening in the first sidewall if the recoater is moved from the first recoater position towards the second recoater position.

4. The process chamber housing of claim 1,
- wherein the first recoater garage is separated from the process chamber at least by a first movable portion of a first side wall of the side walls of the process chamber, wherein the first movable portion of said first side wall is movably supported to be moved between a second closed position and second open position, and
- wherein in that the first side wall, has a second movable portion that is movably supported to be moved between a third closed position and a third open position,
- wherein the second movable portion is in the second closed position if the at least one recoater is in the second recoater position.

5. The process chamber housing of claim 4, wherein
- the second movable portion of the first side wall is biased towards the third closed position, and
- in that the at least one recoater has an abutment configured to entrain the second movable portion of the first sidewall into the third open position if the at least one recoater moves in the backward direction through the first garage opening to the first recoater position.

6. The process chamber housing of claim 2, wherein a normal drawn to the first side wall is within ±15° from a line that is perpendicular to the main flow direction.

7. The process chamber housing of claim 1, wherein a normal drawn to the second side wall is within ±15° from a line that is perpendicular to the main flow direction.

8. The process chamber housing of claim 1, characterized in that the gas inlet has a width $w_i$, the support opening has a width $w_s$, and the gas outlet has a width $w_o$, the widths $w_i$, $w_o$ and $w_s$ being measured perpendicularly to the main flow direction, and in that $w_i$, $w_o$ and $w_s$ obey at least one of the following relations:

$w_i \geq w_s \pm 4$ cm and $w_o \geq w_s \pm 4$ cm $w_i \geq w_s$ and/or $w_o \geq w_s$ $w_i \geq w_s + 1$ cm and/or $w_o \geq w_s + 1$ cm.

9. The process chamber housing of claim 8, wherein $w_s \leq w_c - d_m$, wherein 1 cm $\leq d_m \leq 30$ cm.

10. The process chamber housing of claim 8, wherein $w_c \geq w_i \geq w_c - 5$ cm.

11. The process chamber housing of claim 1, wherein at least a portion of the rear wall above the gas outlet is inclined toward the gas inlet.

12. The process chamber housing of claim 1, wherein the housing door panel has a door panel closed position and/or orientation and a door panel open position and/or orientation, wherein the housing door panel closes the housing door opening when in the door panel closed position and/or orientation and releases the housing door opening when in the door panel open position and/or orientation.

13. The process chamber housing of claim 1, further comprising a second recoater garage that confines a second storage volume.

14. The process chamber housing of claim 13, wherein at least a portion of the first storage volume and/or the second storage volume is confined by at least a portion of at least one of the side walls of the process chamber.

15. The process chamber housing of claim 13, wherein at least a portion of the first storage volume and/or the second storage volume is confined by a part of the housing door panel.

16. An additive manufacturing apparatus for manufacturing three-dimensional objects from a raw material, said apparatus comprising the process chamber housing of claim 1 and a radiation source configured to selectively adhere moieties of raw material to (i) a support unit that is repositionably located in and/or below the support opening and/or (ii) previously adhered moieties of raw material.

17. A process chamber housing for an additive manufacturing apparatus, the process chamber housing comprising a process chamber, wherein the process chamber housing has at least:
a bottom of the process chamber, a ceiling of the process chamber, and side walls of the process chamber that jointly enclose a volume of the process chamber,
a gas inlet in a front wall of the side walls, the gas inlet configured to provide a gas flow into the process chamber,
a gas outlet in a rear wall of the side walls, the gas outlet configured to release the gas flow out of the process chamber,
a first recoater garage confining a first storage volume of the first recoater garage that is dimensioned to house a recoater at a first recoater position,
wherein:
at least one of the side walls of the process chamber has at least one housing door enabling access to the process chamber or is the housing door enabling said access,
the housing door has a housing door opening and a housing door panel,
the first storage volume of the first recoater garage is enclosed by at least one first garage wall and/or a first garage ceiling and/or a first garage bottom,
the bottom of the process chamber has a support opening configured to receive a movable support for supporting a three-dimensional object,
the gas inlet and the gas outlet are positioned at opposite sides of the support opening and face towards each other, thereby being configured to provide the gas flow in a main flow direction from the gas inlet over the support opening to the gas outlet,
at least a portion of the at least one first garage wall and/or the first garage ceiling and/or the first garage bottom is formed by the housing door panel,
the process chamber housing further comprising:
at least one recoater that is movably supported and configured to move in a forward direction from the first recoater position over the support opening to a second recoater position and in a backward direction from the second recoater position to the first recoater position,
wherein said at least one recoater has a front side facing in the forward direction and a rear side facing in the backward direction, and
a second recoater garage, separated from the process chamber at least by a first movable portion of a second side wall of the side walls
wherein:
the second recoater position is in the second recoater garage,
the first movable portion of said second side wall is movably supported to be moved between a first closed position and a first open position,
when in the first closed position, the first movable portion of the second side wall closes a second garage opening in the second sidewall, and
when in the first open position, the first movable portion of the second side wall releases the second garage opening,
the second side wall has a second movable portion that is movably supported to be moved between a second closed position and a second open position,
the second movable portion of the second side wall is the second closed position if the recoater is in the first recoater position, and
when the second movable portion of the second side wall is in the second closed position, the second movable portion of the second side wall closes the second garage opening.

18. The process chamber housing of claim 17, characterized in that the gas inlet has a width $w_i$, the support opening has a width $w_s$, and the gas outlet has a width $w_o$, the widths $w_i$, $w_o$ and $w_s$ being measured perpendicularly to the main flow direction, and in that $w_i$, $w_o$ and $w_s$ obey at least one of the following relations:

$w_i \geq w_s \pm 4$ cm and $w_o \geq w_s \pm 4$ cm $w_i \geq w_s$ and/or $w_o \geq w_s$ $w_i \geq w_s + 1$ cm and/or $w_o \geq w_s + 1$ cm.

19. The process chamber housing of claim 17, wherein at least a portion of the rear wall above the gas outlet is inclined toward the gas inlet.

20. The process chamber housing of claim 17, wherein the housing door panel has a door panel closed position and/or orientation and a door panel open position and/or orientation, wherein the housing door panel closes the housing door opening when in the door panel closed position and/or orientation and releases the housing door opening when in the door panel open position and/or orientation.

21. The process chamber housing of claim 17, further comprising a second recoater garage that confines a second storage volume.

22. An additive manufacturing apparatus for manufacturing three-dimensional objects from a raw material, said apparatus comprising the process chamber housing of claim 17 and a radiation source configured to selectively adhere moieties of raw material to (i) a support unit that is repositionably located in and/or below the support opening and/or (ii) previously adhered moieties of raw material.

23. A process chamber housing for an additive manufacturing apparatus, the process chamber housing comprising a process chamber, wherein the process chamber housing has at least:
    a bottom of the process chamber, a ceiling of the process chamber, and side walls of the process chamber that jointly enclose a volume of the process chamber,
    a gas inlet in a front wall of the side walls, the gas inlet configured to provide a gas flow into the process chamber,
    a gas outlet in a rear wall of the side walls, the gas outlet configured to release the gas flow out of the process chamber,
    a first recoater garage confining a first storage volume of the first recoater garage that is dimensioned to house a recoater at a first recoater position,
wherein:
    at least one of the side walls of the process chamber has at least one housing door enabling access to the process chamber or is the housing door enabling said access,
    the housing door has a housing door opening and a housing door panel,
    the first storage volume of the first recoater garage is enclosed by at least one first garage wall and/or a first garage ceiling and/or a first garage bottom,
    the bottom of the process chamber has a support opening configured to receive a movable support for supporting a three-dimensional object,
    the gas inlet and the gas outlet are positioned at opposite sides of the support opening and face towards each other, thereby being configured to provide the gas flow in a main flow direction from the gas inlet over the support opening to the gas outlet,
    at least a portion of the at least one first garage wall and/or the first garage ceiling and/or the first garage bottom is formed by the housing door panel,
    the process chamber housing further comprising:
    at least one recoater that is movably supported and configured to move in a forward direction from the first recoater position over the support opening to a second recoater position and in a backward direction from the second recoater position to the first recoater position,
    wherein said at least one recoater has a front side facing in the forward direction and a rear side facing in the backward direction,
    and
    a second recoater garage, separated from the process chamber at least by a first movable portion of a second side wall of the side walls
wherein:
    the second recoater position is in the second recoater garage,
    the first movable portion of said second side wall is movably supported to be moved between a first closed position and a first open position,
    when in the first closed position, the first movable portion of the second side wall closes a second garage opening in the second sidewall, and
    when in the first open position, the first movable portion of the second side wall releases the second garage opening,
wherein:
    the housing door panel has a door panel closed position and a door panel open position,
    the first movable portion of at least one of the first side wall and the second side wall, separating a corresponding one of the first recoater garage and the second recoater garage from the process chamber, is movably attached to the housing door panel and is configured to move with the housing door panel when the housing door panel is moved from the door panel open position to the door panel closed position or from the door panel closed position to the door panel open position.

24. The process chamber housing of claim 23, characterized in that the gas inlet has a width $w_i$, the support opening has a width $w_s$, and the gas outlet has a width $w_o$, the widths $w_i$, $w_o$ and $w_s$ being measured perpendicularly to the main flow direction, and in that $w_i$, $w_o$ and $w_s$ obey at least one of the following relations:

$w_i \geq w_s \pm 4$ cm and $w_o \geq w_s \pm 4$ cm $w_i \geq w_s$ and/or $w_o \geq w_s$ $w_i \geq w_s + 1$ cm and/or $w_o \geq w_s + 1$ cm.

25. The process chamber housing of claim 23, wherein at least a portion of the rear wall above the gas outlet is inclined toward the gas inlet.

26. The process chamber housing of claim 23, wherein the housing door panel has a door panel closed position and/or orientation and a door panel open position and/or orientation, wherein the housing door panel closes the housing door opening when in the door panel closed position and/or orientation and releases the housing door opening when in the door panel open position and/or orientation.

27. The process chamber housing of claim 23, further comprising a second recoater garage that confines a second storage volume.

28. An additive manufacturing apparatus for manufacturing three-dimensional objects from a raw material, said apparatus comprising the process chamber housing of claim 23 and a radiation source configured to selectively adhere moieties of raw material to (i) a support unit that is repositionably located in and/or below the support opening and/or (ii) previously adhered moieties of raw material.

* * * * *